United States Patent [19]
Kimura et al.

[11] Patent Number: 4,494,842
[45] Date of Patent: Jan. 22, 1985

[54] AUTOMATIC REWINDING DEVICE FOR FILM IN CAMERA

[75] Inventors: Hiroyuki Kimura; Mutsunobu Yazaki, both of Kanagawa; Hideo Taka; Makoto Masunaga, both of Tokyo, all of Japan

[73] Assignee: Canon Kabushiki Kaisha, Tokyo, Japan

[21] Appl. No.: 441,066

[22] Filed: Nov. 12, 1982

[30] Foreign Application Priority Data

Nov. 13, 1981 [JP] Japan .................................. 56-182036
Nov. 13, 1981 [JP] Japan .................................. 56-182037
Nov. 13, 1981 [JP] Japan .................................. 56-182038

[51] Int. Cl.³ .............................................. G03B 1/18
[52] U.S. Cl. ................................ 354/173.11; 354/214
[58] Field of Search ............... 354/173, 212, 213, 214, 354/217, 218, 173.11

[56] References Cited

U.S. PATENT DOCUMENTS

| 4,174,888 | 11/1979 | Hunn et al. | 354/217 |
| 4,297,019 | 10/1981 | Yagi et al. | 354/217 |
| 4,299,466 | 11/1981 | Harvey | 354/214 |
| 4,304,480 | 12/1981 | Fukahori et al. | 354/214 |
| 4,311,377 | 1/1982 | Matteson | 354/217 |
| 4,362,370 | 12/1982 | Iwata et al. | 354/217 |
| 4,400,074 | 8/1983 | Akiyama et al. | 354/214 |

*Primary Examiner*—Russell E. Adams
*Attorney, Agent, or Firm*—Toren, McGeady and Stanger

[57] ABSTRACT

When a detector detects that a motorized transport arrangement is winding film, or when a resetting arrangement detects that a full frame has been wound, a reset signal resets a timer. When the detector arrangement senses that the transport is not moving the film and the film has not been wound a full frame, a release signal actuates the timer which generates a switching signal. A switchover facility responds to the switching signal to cause the transport to stop winding and start rewinding.

9 Claims, 4 Drawing Figures

AUTOMATIC REWINDING DEVICE FOR FILM IN CAMERA

BACKGROUND OF THE INVENTION

1. Field of the Invention

This invention relates to motorized cameras and particularly to automatic camera rewind devices which automatically start to rewind the film when the film feed is stopped during winding.

2. Description of the Prior Art

Known automatic rewind devices use torque sensors to detect the changes in torque acting on a motor driven sprocket or spool when a film cartridge no longer feeds film, and change the winding operation to a rewinding operation.

Such devices have a number of problems. Specifically, they require the use of torque detectors capable of detecting torque changes. Such torque detectors are generally in the form of a resilient member such as a spring which is arranged to be deformed when the magnitude of the torque or force exceeds a predetermined level to indicate changes in torque. Therefore, the magnitude of the forces or torque detected vary depending upon the characteristics of the individual springs. The force necessary to initiate a rewinding operation may therefore vary from article to article. Hence, sufficient reliability cannot be assured.

Furthermore, the force necessary to extract the film from the cartridge varies from cartridge to cartridge, and even with temperature, because the film often hardens at low temperatures. Therefore, it is very difficult to assure automatic initiation of the rewinding operation in all situations.

Attempts have been made to eliminate the disadvantage by sensing the movement of the perforations of the film to detect whether the film is moving. This attempt is disclosed in U.S. Pat. No. 4,304,480. However, such a device requires detecting movement of the perforations of the film in combination with a current supply allowing the motor to be energized for a prescribed short period each time a winding operation is initiated. The arrangement is such that when it detects movement of the film perforation before the current supplied to the motor stops, termination of current to the motor is deferred to wind the film through one frame. Otherwise, the current supplied to the motor ends in that period. Therefore, the entire circuitry of the device becomes objectionably complicated. Another disadvantage of this device is that stoppage of the film feed before the film is wound a full frame does not cause automatic initiation of the film rewind operation.

Summary of the Invention

With the foregoing in mind, it is an object of the present invention to provide an automatic rewinding device for a camera which can initiate a rewinding operation with high reliability when feeding of film is stopped before completion of one cycle of winding operation.

This and other objects of the present invention will become apparent from the following description of embodiments thereof.

DETAILED DESCRIPTION OF THE PREFERRED EMBODIMENTS

Figure 1:
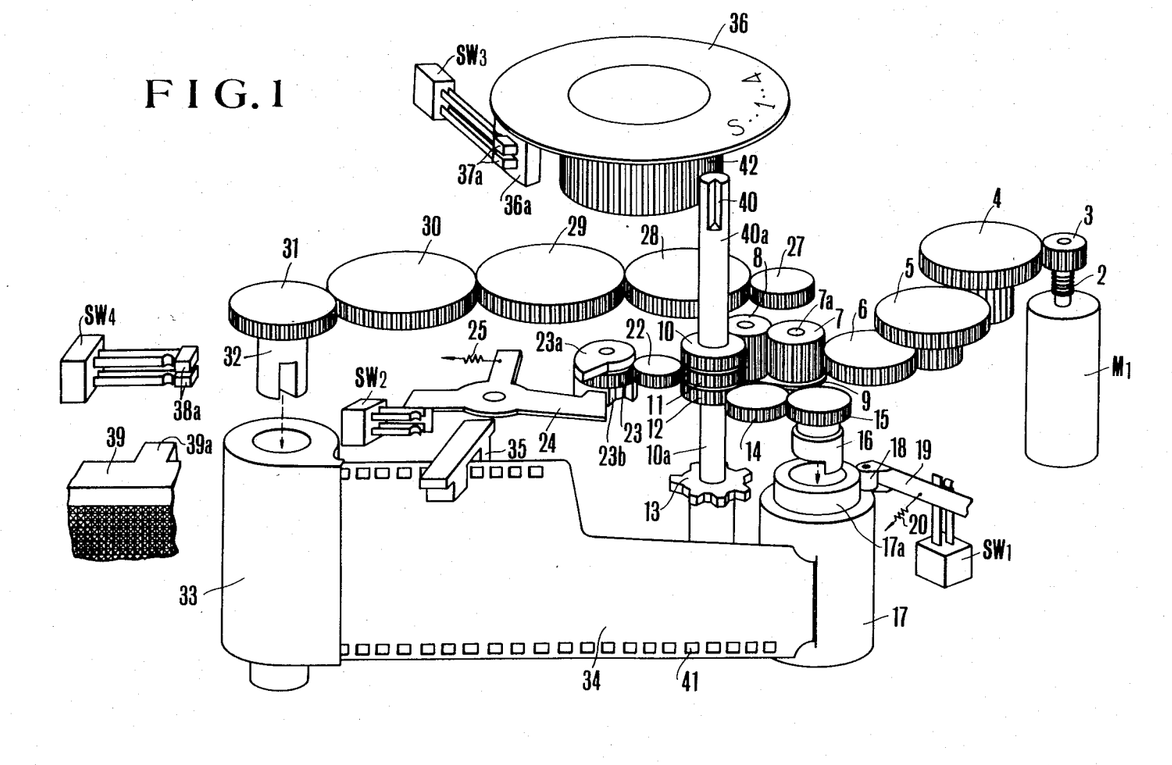
FIG. 1 is an exploded perspective view of an embodiment of an automatic rewinding device for camera according to the present invention.

In FIG. 1, an electric motor M1 has an output shaft on which is mounted a pinion gear 3 through a friction spring 2. Motion of motor M1 after having been reduced in speed by gears 4, 5 and 6 is transmitted to a gear 7. A gear 8 meshes with the gear 7 and is mounted on a carrier 9 with the center of rotation at a shaft 7a of the gear 7. Therefore, depending upon the direction of rotation of the motor M1, the gear 8 can come into mesh either with piled-up-3-stage gears 10, 11 and 12, or with a gear 27. The gear 10 is connected through a shaft 10a thereof to a film-advancing sprocket 13. The gear 12 is drivingly connected through gears 14 and 15 and a friction spring 16 to a spool 17. The spool 17 is provided with a smaller diameter portion 17a, on the outer periphery of which abuts a film sensor or roller 18 supported on a member 19 under the action of a spring 20. When the tongue of a film 34 is fully convoluted on the spool 17, the roller 18 rides on the film 34 as the support member 19 pivotally moves, thereby a switch SW1 is turned on. Rotation of the gear 11 is transmitted through a gear 22 to a gear 23. The gear 23 has a cam 23a on the upper surface thereof which is operatively connected to a charging mechanism for a shutter and an automatic focusing mechanism (not shown). On the lower surface of the gear 23 there is a cam 23b for controlling one-frame advancement of the film on which abuts a lever 24 under the action of a spring 25. When a lobe of the lever 24 drops into a recess of the cam 23b, a switch SW2 is turned on to stop rotation of motor M1 and the one-frame advancement is completed. Motion of the gear 27 is transmitted through gears 28, 29, 30 and 31 successively to rotate a film rewinding fork 32 engaging in a hub of a cartridge 33. Across a path of movement of the perforations 41 of the film 34 there is provided a photo-coupler 35. Each time the perforation 41 moves past this photo-coupler 35, a signal is given to a drive circuit to be described later. On the upper surface of gear 10 there is a frame counter drive gear 40 through a shaft 40a. The gear 40 cooperates with a gear 42 to turn a counter disc 36 one graduation for every one revolution of the sprocket 13. On the marginal portion of the lower surface of the counter disc 36 is a projected portion 36a in fixedly secured relation thereto at such a location that when the counter disc 36 points between "S" and "1", this projected portion 36a pushes heads 37a of movable contacts of a switch SW3, thereby the switch SW3 is turned off. A back cover 39 of a camera housing (not shown) also has a projected portion 39a which is arranged upon closure of the back cover 39 to push heads 38a of movable contacts of a switch SW4 so that the switch SW4 is turned off.

Figure 2:
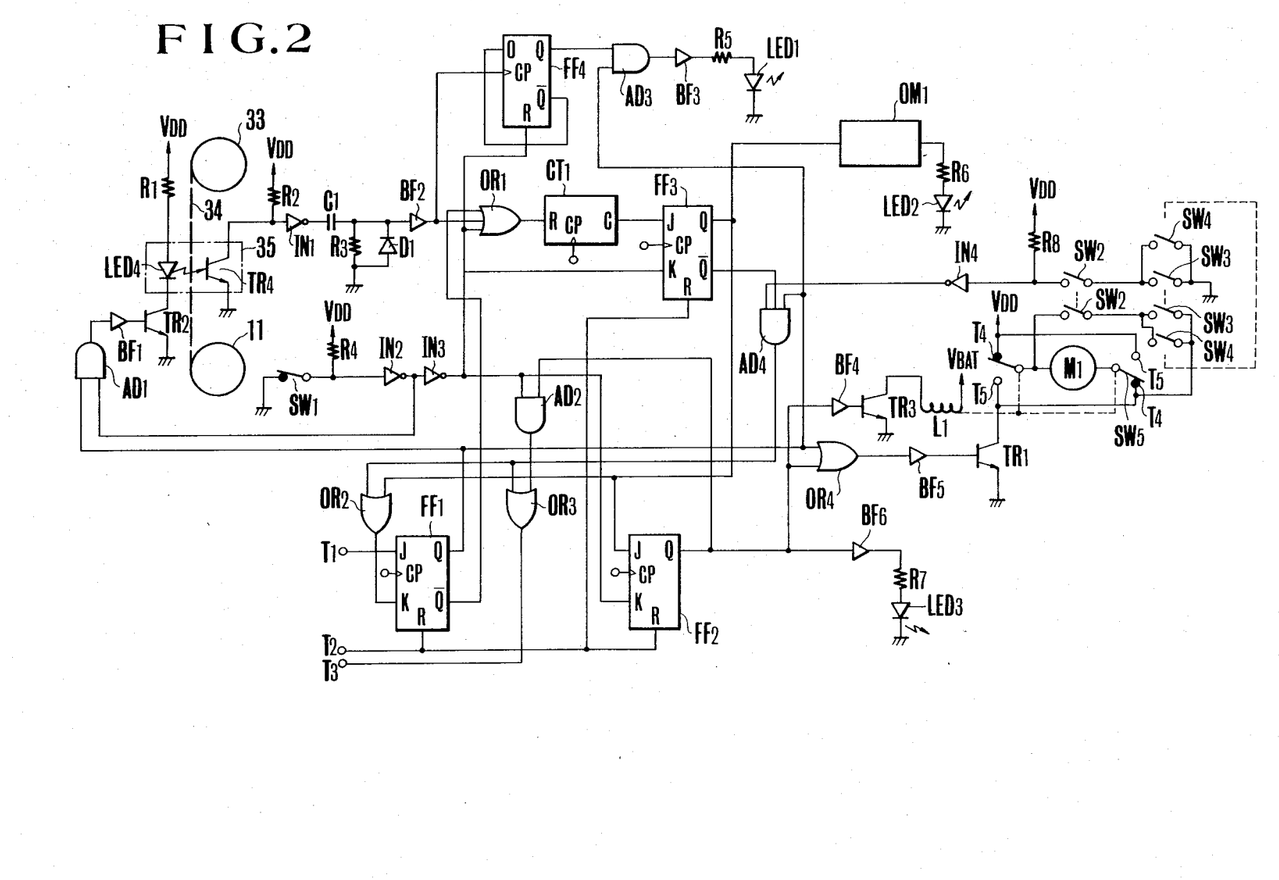
FIG. 2 is an electrical circuit diagram illustrating a control circuit of FIG. 1 embodiment.

Referring next to FIG. 2, there is shown the circuitry of the camera of FIG. 1.

FF1 is a JK flip-flop which is set when a winding operation of the film is initiated, or in progress, or when blank frames are being transported, thereby a signal of high level is produced at an output terminal Q thereof, and which has an input terminal J connected to a terminal T1 of a control circuit (not shown) to receive a film winding-up signal.

A clock pulse generating circuit (not shown) is connected to a clock pulse input terminal CP of FF1 so that a train of clock pulses enter the FF1.

Another input terminal K of FF1 is connected to the output of an OR circuit OR2. A terminal T2 of a control circuit (not shown) is connected to a reset input terminal R so that when an electrical power source is thrown, or at other necessary points in time, a certain signal of high level enters the FF1. On the other hand, the output terminal Q of JK flip-flop FF1 is connected to an input terminal of an AND circuit AD1, an input terminal of an AND circuit AD3 an input terminal of an AND circuit AD4 and an input terminal of an OR circuit OR4. Also the output terminal $\overline{Q}$ of JK flip-flop FF1 is connected to an input terminal of an OR circuit OR1. OR2 is an OR circuit which produces an output of high level at a point in time that an excessive tension of the film is detected during film winding up, or that the termination of each cycle of winding is detected during film feeding, as the switch SW2 is transferred. The output terminal of a JK flip-flop FF3 is connected to an input terminal J of a JK flip-flop FF2, an input terminal of the OR circuit OR2, and an input terminal of a monostable multivibrator OM1.

An OR circuit OR3 produces a signal of high level in response to winding completion or rewinding end. Its output terminal is connected to a terminal T3 of a control circuit (not shown). The output terminal of AND circuit AD2 is connected to an input terminal of the OR circuit OR3. The output terminal of AND circuit AD4 is connected to another input terminal of OR circuit OR3 and an input terminal of OR circuit OR2.

A JK flip-flop FF2 is set in response to detection of the excessive tension of the film and then produces a signal of high level at its Q terminal to initiate a rewinding operation, it is reset by the film tongue convolusion sensor switch SW1 and then produces a signal of low level at its Q terminal.

The terminal T2 of the control circuit (not shown) is connected to the reset input terminal R of FF2 so that when the electrical power source is thrown, or at other desired points in time, a signal of high level enters it.

The clock pulse generating circuit (not shown) is connected to the clock pulse input terminal CP of FF2 so that a train of clock pulses enter it. An inverter circuit IN3 has an output terminal which is connected to an input terminal K of JK flip-flop FF2, an input terminal of AND circuit AD2, an input terminal K of JK flip-flop FF3, an input terminal of OR circuit OR1, and a reset input terminal of a D flip-flop FF4.

The output terminal Q of JK flip-flop FF2 is connected to an input terminal of AND circuit AD2, an input terminal of a buffer circuit BF6, an input terminal of OR circuit OR4, and an input terminal of a buffer circuit BF4. The output terminal of buffer circuit BF6 is connected to ground through a resistor R7 and a light-emitting diode LED3. The resistor R7 is a current limiting resistor, and the light-emitting diode LED3 is a display element for indicating that the rewinding is in progress.

An AND circuit AD2 responds to disconnection of the film tongue from the takeup spool for producing a signal of high level representing the termination of the rewinding operation as the JK flip-flop FF2 produces the signal of high level at its output terminal Q.

An OR circuit OR4 responds to the signal of high level from the JK flip-flop FF2 or to blank feeding of film for producing a signal of high level. Its output terminal is connected to the input terminal of buffer circuit BF5. Next, AD1 is an AND circuit which turns on a light-emitting diode LED4 constituting part of the photo-coupler 35 after the film tongue has been fully taken up by the winding-up signal. One of the terminals of the switch SW1 is grounded, and the other terminal is connected to the input terminal of an inverter circuit IN2. An electrical power source VDD also is connected to the input terminal of inverter circuit IN2 through a resistor R4. The resistor R4 is a pull-up resistor of the inverter circuit IN2. The output terminal of inverter circuit IN2 is connected to the input terminal of an inverter circuit IN3 and an input terminal of AND circuit AD1. The output terminal of AND circuit AD1 is connected to the input terminal of a buffer circuit BF1. The output terminal of buffer circuit BF1 is connected to the base of a transistor TR2. The transistor TR2 is a switching transistor for turning on and off the light-emitting diode LED4 of photo-coupler 35. The emitter of transistor TR2 is grounded. The electrical power source VDD is connected through a resistor R1 and the light-emitting diode LED4 to the collector of transistor TR2. LED4 is a light-emitting diode constituting part of the photo-coupler 35. R1 is a resistor limiting current from the electrical power source VDD. TR4 is a photo-transistor constituting the photo-coupler 35 together with the light-emitting diode LED4. 35 is a photo-coupler as a means for detecting a moving state of the film 34 by detecting a moving state of the perforations 41 of the film 34 in the path between the light-emitting diode LED4 and photo-transistor TR4. The emitter of photo-transistor TR4 is grounded. The electrical power source VDD is connected through a resistor R2 to the input terminal of inverter circuit IN1 and the collector of transistor TR4.

The resistor R2 is a pull-up resistor of the inverter circuit IN1. The output terminal of inverter circuit IN1 is connected to the input terminal of a buffer circuit BF2 through a condenser C1 and grounded through a parallel-connected circuit of a resistor R3 and a diode D1. The condenser C1 and resistor R3 constitute a circuit for differentiating the output signal from inverter circuit IN1. The diode D1 is a means for clamping the negative output of the differential waveform. The output terminal of buffer circuit BF2 is connected to an input terminal of OR circuit OR1 and the clock pulse input terminal CP of D flip-flop FF4. Next, SW1 is the aforesaid switch as a switching means which turns on when the tongue of film 34 is taken up on the spool 17.

AD flip-flop FF4 turns on and off each time one of the perforations 41 is detected. Its inversion output terminal $\overline{Q}$ is connected to the input terminal D. The output terminal Q is connected to an input terminal of an AND circuit AD3. The output terminal of AND circuit AD3 is connected to the input terminal of buffer circuit BF3 of which the output terminal is grounded through a resistor R5 and a light-emitting diode LED1. The resistor R5 is a current limiting resistor. The light-emitting diode LED1 is a means for indicating the fact that the film is being wound up. An AND circuit AD3 produces an output signal of high level only when the winding is in progress.

An OR circuit OR1 responds to any of the pulse signals representing the facts that the winding is not in progress, that the power-up is in progress, and that the perforation is in detection for producing an output signal of high level which is applied to reset a counter circuit CT1. The output terminal of OR circuit OR1 is connected to the reset input terminal R of counter circuit CT1. CT1 is a counter circuit for detecting when the perforations 41 are not in move. The clock pulse generating circuit (not shown) is connected to the clock pulse input terminal CP of counter circuit CT1. The carry output terminal C is connected to the terminal J of JK flip-flop FF3. FF3 is a JK flip-flop that is a circuit responsive to detection of the excessive tension of the film by the CT1 for latching this detecting signal. The clock pulse generating circuit (not shown) is connected to the clock pulse input terminal CP.

The terminal T2 of the control circuit (not shown) is connected to the reset input terminal R. The output terminal Q is connected to the input terminal J of JK flip-flop FF2, an input terminal of OR circuit OR2 and the input terminal of monostable multivibrator OM1. The inversion output terminal $\overline{Q}$ is connected to an input terminal of AND circuit AD4. AD4 is an AND circuit for detecting occurrence of a closure of a switch SW2 when the film is being fed without excessive tension to produce an output signal of high level. The output terminal of an inverter circuit IN4 is connected to an input terminal of AND circuit AD4.

The output terminal of buffer circuit BF5 is connected to the base of a transistor TR1. The transistor TR1 is a switching transistor which is rendered conducting by the output of OR4 when the winding or rewinding is in progress. The emitter is grounded, and the collector is connected to a terminal of a switch SW5. The output terminal of buffer circuit BF4 is connected to the base of a transistor TR3. The transistor TR3 is a switching transistor which is rendered conducting by the output of BF4 during the time when the film is being rewound. The emitter is grounded, and a battery VBAT is connected through a relay L1 to the collector of transistor TR3. The relay L1 is a means responsive to the signal from transistor TR3 to act on the control terminal of switch SW5 so that the SW5 is changed over. SW5 is a switch means for changing the direction of rotation of the motor M.

The electrical power source VDD is connected to the terminal T5 of switch SW5 and the terminal T4 of another switch SW5. The electrical power source VDD is connected through a resistor R8 between the input terminal of inverter circuit IN4 and a terminal of switch SW2. The resistor R8 is a pull-up resistor of inverter circuit IN4. The opposite terminal of switch SW2 is connected to terminals of switches SW3 and SW4. The opposite terminals of switches SW3 and SW4 are grounded. Both of the ends of a winding of motor M1 are connected to respective control terminals of switches SW5. One end of the winding of motor M1 is connected to a terminal of switch SW2, the opposite terminal of which is connected to terminals of switches SW3 and SW4. Further the opposite terminals of switches SW3 and SW4 are connected to a terminal of switch SW5.

A SW2 switch is arranged as illustrated in FIG. 1 to turn on upon completion of the winding operation. A switch SW3 is arranged upon opening of the back cover to turn on. Member SW4 is a switch arranged to continue opening until all blind exposures are made. Motor M1 when in normal rotation does winding and when in reversed rotation does rewinding.

Next, the output terminal of monostable multivibrator OM1 is grounded through a resistor R6 and a light-emitting diode LED2. The resistor is a current-limiting resistor. The light-emitting diode LED2 is a means for indicating the fact that the takeup spool only slips with so-called brace of film as the cartridge can no longer feed film.

The device of FIGS. 1 and 2 operates as follows:

First assuming that the film 34 or cartridge 35 is not loaded in the camera yet and that while the back cover 39 remains open, a shutter button is pushed down, the device then operates in the following manner. With the back cover 39 open, the switch SW4 is closed and the frame counter 36 is set to the "S" position by a mechanism (not shown) where switch SW3 is in OFF state since its heads 37a ride on the projecting portion 36a of counter 36. Also, since the cartridge 33 is not loaded in the camera, the film sensor or roller 18 lies in contact with the outer periphery of the smaller diameter 17a of spool 17 so that switch SW1 is OFF. Then, when the shutter button is pushed down, the automatic focusing mechanism and the shutter act in sequence. When the shutter closes, a member (not shown) turns the film feed control lever 24 in a clockwise direction (as viewed from the above of the camera and this goes hereinafter unless otherwise specified), so switch SW2 is turned off. After that, a signal of high level for initiation of a film winding operation from the control circuit (not shown) is applied through terminal T1 to input J of JK flip-flop FF1, and the JK flip-flop FF1 produces a signal of high level at its output terminal Q which is then applied to OR circuit OR4. Responsive to this, OR circuit OR4 produces a signal of high level which is applied through buffer circuit BF5 to turn on transistor TR1. Since, at this time, the switches SW5 at either end of the winding of the motor M1 are in T4 positions, the motor M1 rotates in a counterclockwise direction. Motion of motor M1 is transmitted through the gears 4, 5, 6 and 7 to ground plate 9 fixedly mounted to shaft 7a of gear 7, so that gear 8 rotatably mounted on ground plate 9 is brought into engagement with gears 10, 11 and 12. This engagement of gear 8 with gears 10, 11 and 12 drives sprocket 13 fixedly mounted to shaft 10a of gear 10 and takeup spool 17 through gears 14 and 15. Both the spocket 13 and spool 17 are driven to rotate in a direction to wind up film, and cam 23a on gear 23 is turned to effect charging through a charging system. Since, during this time, switch SW1 is OFF, the signal appearing at the input of inverter circuit IN2 is of high level. This signal of high level is inverted by inverter circuit IN2 to low level, and this output signal of low level is inverted by inverter circuit IN3 to high level. This signal of high level is applied to OR circuit OR1 and OR circuit OR1 produces a signal of high level which is applied to the reset input terminal R of counter circuit CT1, thereby CT1 is held in reset state. Therefore the output signal at the carry output terminal C of counter circuit CT1 does not become high level. Also, the signal of high level from inverter circuit IN3 is applied to the input terminal K of JK flip-flop FF3. Then JK flip-flop FF3 produces a signal of low level at the output terminal Q which is applied to the input terminal J of JK flip-flop FF2 and OR circuit OR2, and a signal of high level at the inversion output terminal $\overline{Q}$ which is applied to AND circuit AD4. As charging goes on, the member which has so far turned the film feed control lever 24 in the clockwise direction is also charged, causing the lever 24 to turn in the counterclockwise direction under the action of spring 25.

When the film 34 has been advanced one frame, the lobe in the head of lever 24 drops into the recessed portion of cam 23b, thereby switch SW2 is turned on. Then the signal at the input of inverter circuit IN4 becomes low level, and this signal of low level is inverted by inverter circuit IN4 so that a signal of high level is applied to AND circuit AD4. Since AND circuit AD4 is supplied with another signal of high level from the output terminal Q of JK flip-flop FF1, all the input signals of AND circuit AD4 are of high level, AND circuit AD4 produces a high level signal which is applied to OR circuits OR2 and OR3. Responsive to this, OR circuit OR3 produces a signal of high level, or "End" signal which is applied through terminal T3 to the control circuit (not shown), and OR circuit OR2 produces a signal of high level which is applied to the input terminal K of JK flip-flop FF1. Then, JK flip-flop FF1 produces a signal of low level at the output terminal Q thereof which is applied to OR circuit OR4. On the other hand, the input terminal J of JK flip-flop FF2 receives a signal of low level. JK flip-flop FF2 produces a signal of low level at the output terminal Q thereof which is applied to OR circuit OR4. At this time, therefore, OR circuit OR4 produces a signal of low level which is applied through buffer circuit BF5 to turn off transistor TR1. Since, at the same time, switch SW2 turns on to short-circuit both of the ends of the winding of motor M1, motor M1 rapidly stops. Thus, the film transportation mechanism completes one cycle of operation. It is to be noted that during this time the counter drive gear 40 is out of mesh with gear 42 of counter 36 so that it never happens that counter 36 advances, and therefore that switch SW3 turns on. It will be understood that even when the back cover 39 is open, actuation of the shutter button can normally run the camera with an advantage that it is easy to check the operation of the various mechanisms of the camera.

Next assuming that film 34 or cartridge 33 is not loaded in the camera and the back cover 39 is in the closed state, then when the shutter button is pushed down, the camera operates as follows: At this time, the projecting portion 39a turns off switch SW4 and a mechanism (not shown) is operated to bring counter drive gear 40 into engagement with gear 42 of counter 36. Since, however, similarly to the former case, the film 34 is not loaded in camera, the film sensing roller 18 remains on the smaller diameter 17a of spool 17 so that switch SW1 is OFF. Under this condition, the depression of the shutter button is followed by the same operation as that described in connection with the former case where the back cover 39 is open. Upon termination of one cycle of winding operation, however, though switch SW2 is turned on by the film feed control lever 24 as its lobe enters the recessed portion of cam 23b, switch SW4 remains OFF since the back cover 39 is in the closed position, and switch SW3 too remains OFF since counter 36 does not yet point beyond "S" range. Therefore, the input signal of inverter circuit IN4 is of high level, and a signal of low level is applied to AND circuit AD4. Then AND circuit AD4 produces a signal of low level which is applied to OR circuit OR2. Since another input signal of OR circuit OR2 or the output signal from the terminal Q of JK flip-flop FF3 is of low level, OR circuit OR2 produces a signal of low level which is then applied to the input terminal K of JK flip-flop FF1. In short, the output signal at the terminal Q of JK flip-flop FF1 takes high level similarly to the former case. Therefore, transistor TR1 continues conducting to supply current to motor M1 and no short-circuiting across the ends of motor M1 occurs. Therefore, the spool 17, sprocket 13, and gear 11 continue rotating in a direction to wind up film, while the film feed control lever 24 is turned clockwise by the next revolution of cam 23b as its lobe is pushed out of the recessed portion of cam disc 23b. Then, switch SW2 is turned off again. Such procedure repeats itself a number of times until frame counter 36 is advanced by the drive gear 40 to the "1" position where the projected portion 36a of counter 36 is out of engagement with the heads 37a of switch 37, and switch SW3 is turned on. After that, when the lobe of film feed control lever 24 drops into the recessed portion of cam 23b, as switch SW2 turns on, AND circuit AD4 is given a signal of high level. Therefore, AND circuit AD4 responsive to the input signals which are all of high level produces a signal of high level which is applied to OR circuits OR2 and OR3. Then, OR circuit OR2 produces a signal of high level which is applied to the input terminal K of JK flip-flop FF1. Then, JK flip-flop FF1 produces a signal of low level at the output terminal Q which is then applied to OR circuit OR4. Since another input signal of OR circuit OR4 is also of low level, the output signal of OR circuit OR4 changes from high to low level. Responsive to this signal, transistor TR1 cuts off current supply to motor M1. As the ends of motor M1 were short-circuited, rapid braking acts on motor M1. At the same time OR circuit OR3 produces an "END" signal which is applied through terminal T3 to the control circuit (not shown). The foregoing step of operation corresponds to a sequence of blind exposures of film though the film is not present in the camera. This has an advantage that an affirmation of whether or not the preliminary feeding operation is normal can be easily carried out. The subsequent operation is, because of switch SW3 being closed instead of the opening of switch SW4, exactly the same when back cover 39 is open, except for advancing of counter 36. This leads to the possibility of checking the camera operation without having to load the film 34.

Alternatively assuming that the camera is loaded with film 34 or cartridge 33. After film 34 is inserted into camera and back cover 39 is closed, when the shutter button is pushed down, the aforesaid film 34 is fed for blind exposures in a similar manner to that described in connection with the unloaded camera. During this time, film 34 is transported by sprocket 13 to takeup spool 17 while the tongue is brought into connection with the spool 17 by an auto-loading mechanism (not shown). When the film tongue is fully taken up on the spool 17, the film sensing roller 18 moves away from the smaller diameter 17a of spool 17, thereby the lever 19 is turned in the clockwise direction to turn on switch SW1. When switch SW1 closes, the input signal of inverter circuit IN2 becomes low level. Then, a signal of high level is applied from IN2 to AND circuit AD1. Since the other input terminal of this AND circuit AD1 is supplied with another signal of high level from the output terminal Q of JK flip-flop FF1, it is at this time that AND circuit AD1 produces an output signal of high level. This signal is then applied through buffer circuit BF1 to turn on transistor TR2. Thus, photo-coupler 35 starts to operate. Photo-coupler 35 responsive to passage of each perforation of film 34 therethrough produces an ON-and-OFF signal at the output of transistor TR4 which is applied to inverter circuit IN1. The inverted ON-and-OFF signal by inverter circuit IN1 after having been differentiated by condenser C1 and resistor R3 is applied through buffer circuit BF2 to OR circuit OR1.

So long as photo-coupler 35 produces a periodic sequence of ON-and-OFF signals, the output signal at the carry terminal C of counter circuit CT1 never assumes a high level, since the signals of high level from the output of OR circuit OR1 which are applied to the reset input terminal of counter circuit CT1 reset the latter repeatedly before counter circuit CT1 counts a predetermined number of pulses. On the other hand, the clock pulse input terminal CP of D flip-flop FF4 is supplied with the periodic sequence of ON-and-OFF signals in the differentiated form through buffer circuit BF2. Then, D flip-flop FF4 produces an output signal at the terminal Q which repeatedly changes between high and low levels and which is then applied to AND circuit AD3. Since the other input signal of AND circuit AD3 from the output terminal Q of JK flip-flop FF1 is of high level, AND circuit AD3 produces a corresponding signal to the high and low level repetition signal which is applied through buffer circuit BF3 and resistor R5 to light-emitting diode LED1, thereby light-emitting diode LED1 is intermittently lighted on, indicating "film in winding". It is to be noted in this embodiment of the invention that the film sensing roller 18 and photo-coupler 35 are both arranged to detect the perforations 41 of the same side, whereby independently of where photo-coupler 35 is located and no matter how long the length of tongue of the leader of film 34 may be, there is no possibility for photo-coupler 35 to fail detection of the perforations 41 despite the film 34 being taken up on the spool 17. Such arrangement of photo-coupler 35 and film sensing roller 18 may be altered provided that it is assured that the first perforation arrives at the photo-coupler 35 when the roller 18 detects the film 34.

It is to be understood that the operator need only to put the cartridge 33 into a chamber therefor in the camera, close the back cover 39 and push down the shutter button only once before the film 34 is automatically extracted until a fresh area for the first frame of film 34 appears in the exposure aperture and the display of the fact that the film 34 has been ready to make the first exposure is simultaneously presented. Thus, the photographer can enjoy quick and easy loading of the camera and can take a 1st shot with a sense of security. After that, when the shutter button is pushed down, the auto-focusing mechanism and shutter operate in a similar manner to that described in connection with the above-described case where film 34 is not loaded. Then, spool 17 and sprocket 13 rotate in the direction to wind-up film (in this case, these parts actually wind up film 34) and stop when the film 34 is advanced one frame. During this time, light-emitting diode LED1 gives off light intermittently, indicating that film is being wound up, and counter 36 advances one graduation for one frame. Also during this time, because the film 34 is being pulled out of cartridge 33, fork 32 is rotated in the counter-clockwise direction along with gears 27 to 31. But since gears 27 and 8 are out of mesh with each other, no adverse effect is produced. However, as shooting goes on, when film 34 in cartridge 33 is no longer available during the film winding operation, the load on motor M1 rapidly increases. But, at this time, a slippage occurs between friction spring 2 and pinion gear 3 to avoid breakage of the perforations 41. Since the occurrence of such slippage between friction spring 2 and pinion gear 3 hinders film 34 from being transported past photo-coupler 35, the output signal of photo-coupler 35 is maintained constant at either one of the high and low levels and the differentiation of this results in producing no signal. Therefore, the input signal of OR circuit OR1 is held at low level. And since switch SW1 is on, the input signal of inverter circuit IN2 is of low level, and the output signal from inverter circuit IN3 to OR circuit OR1 is of low level. Furthermore it is at this time that the output signal at the inversion output terminal $\overline{Q}$ of JK flip-flop FF1 also is of low level. Therefore, counter circuit CT1 with its reset input terminal R is no longer supplied with the output signal of high level from OR circuit OR1, namely, "RESET" signal. After the elapse of a prescribed time (for example, 0.5 seconds) when the certain number of clock pulses have been counted, counter circuit CT1 produces an output signal of high level at its output terminal Q. It is to be noted in this connection that the time determined by this counter circuit CT1 is pre-adjusted to be slightly longer than that necessary for film 34 to move at a normal speed past the photo-coupler 35 from one perforation 41 to the next. When this signal of high level is applied to the input terminal J of JK flip-flop FF3, the output signal at the output terminal Q of JK flip-flop FF3 becomes high level, and the output signal at the inversion output terminal $\overline{Q}$ becomes low level. This output signal Q is applied to OR circuit OR2, and OR circuit OR2 produces a signal of high level which is then applied to input terminal K of JK flip-flop FF1. JK flip-flop FF1 responsive to application of the signal of high level on input terminal K thereof produces a signal of high level at inversion output terminal $\overline{Q}$ which is applied to OR circuit OR1. Responsive to this, OR circuit OR1 gives a signal of high level to the reset input terminal R of counter circuit CT1. From this time onwards, RESET signal continues staying at the reset input terminal R of counter circuit CT1 so that counter circuit CT1 is in reset state. Also the signal of high level from the output terminal Q of JK flip-flop FF3 is applied to monostable multivibrator OM1. Monostable multivibrator OM1 produces a signal of high level for a predetermined time. This signal is then applied through R6 to light-emitting diode LED2. Therefore, light-emitting diode LED2 is lighted on for the predetermined time, indicating "FILM END". Further, the signal of high level from the output terminal Q of JK flip-flop FF3 is applied to input terminal J of JK flip-flop FF2 which then produces a signal of high level at the output terminal Q. This signal is applied through buffer circuit BF4 and OR circuit OR4 to buffer circuit BF5. Thereby transistors TR1 and TR3 are turned on, and relay L1 connected to transistor TR3 moves switch SW5 to T5 position where motor M1 is supplied with current flowing in the reversed direction to that when in film winding up, and rotates in the clockwise direction. It is to be noted that since, at this time, the short-circuit of motor M1 is opened, there is no relation to whether switch SW2 is on or off.

Clockwise motion of motor M1 is transmitted through pinion gear 3 and gears 4, 5 and 6 to gear 7. Rotation of gear 7 turns ground plate 9 in the clockwise direction, thereby gear 8 is taken out of engagement with gears 10, 11 and 12 and brought into engagement with gear 27. Then, rotation of gear 7 is transmitted through gears 8, 27, 28, 29, 30 and 31 to turn fork 32 in the clockwise direction. Thus, film 34 starts to be rewound. When rewinding film, sprocket 13 and, therefore, counter drive gear 40 are rotated in the clockwise direction by the film 34 so that counter 36 turns backward. Also, spool 17 likewise is rotated in the clockwise direction by film 34. This rotation is transmitted only to gears 15, 14 annd 12, leaving rotation of gear 10 out of interference with rotation of gear 12. It is further to be noted that gear 23 having the charging and feed cycle control functions is not moved regardless of the rewinding movement of film so that there is no possibility of restraining the parts of the charging system and the feed cycle control lever 24 from movement due to stick fast to cam 23a or 23b. Also during this time, a signal of high level from the output terminal Q of JK flip-flop FF2 is applied through buffer circuit BF6 and resistor R7 to light-emitting diode LED3, thereby light-emitting diode LED3 is lighted on intermittently, indicating "FILM REWINDING". As film rewinding goes on, when counter 36 comes just beyond "1", the projected portion 36a of counter 36 acts on the heads 37a of switch SW3, thereby switch SW3 is turned off. Since, at this time, AND circuit AD4 is in closure, the circuit does not change its operation. After that, as the film rewinding nears the terminal end, when film 34 is detached from takeup spool 17, film sensing roller 18 comes into abutting engagement on the smaller diameter 17a of spool 17 and switch SW1 is turned off. Then, the input signal to AND circuit AD2 is changed to high level by inverter circuits IN2 and IN3. Since another input of AND circuit AD2, or the output signal from the output terminal Q of JK flip-flop FF2, is also of high level, the input signals of AND circuit AD2 both take high level. AND circuit AD2 then produces a signal of high level which is applied to OR circuit OR3. OR circuit OR3 then produces a signal of high level, namely, END signal which is applied to the control circuit (not shown) through terminal T3. At the same time, JK flip-flop FF2 too is given a signal of high level at its input terminal K, and in turn produces a signal of low level at the output terminal Q which is applied to OR circuit OR4 and buffer circuits BF4 and BF6. On the other hand, at this time, the output signal at the output terminal Q of JK flip-flop FF1 is of low level and OR circuit OR4 produces a signal of low level to buffer circuit BF5. Therefore, transistors TR1 and TR3 are both turned off, terminating the current supply to motor M1 and relay L1. Then switch SW5 moves to T4 position. Thus motor M1 stops in film winding mode. At the same time light-emitting diode LED3 for indication of "FILM REWINDING" is lighted off, completing the film rewinding operation.

As has been described above, the present invention has achieved the possibility of initiating a film rewinding in automatic response to detection of the fact that when the film cartridge is exhaused, the photo-coupler no longer repeatedly changes its output signal between ON and OFF, and also of terminating the rewinding operation in automatic response to detachment of the film tongue from the takeup spool. Therefore, an advantage is produced that after the last frame has been exposed, there is no need for the operator to take any trouble about the rewind release actuation and manipulation of the film rewind crank. Thus, the camera becomes very convenient. Also each of the operation say "film winding in progress", "film winding end" and "film rewinding in progress" is made indicated by the light-emitting diode, enabling the operator to shoot with safety.

Figure 3:
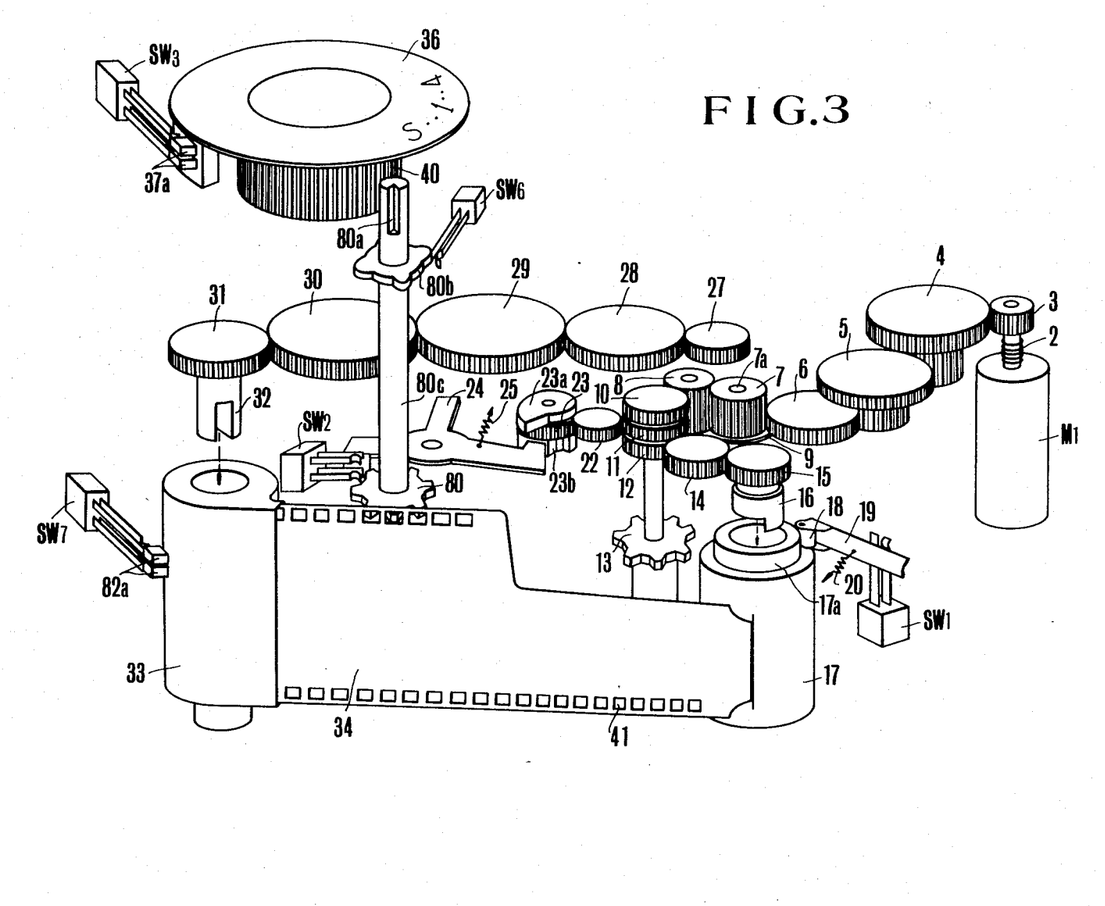
FIG. 3 is an exploded perspective view of another embodiment of the present invention.
Figure 4:
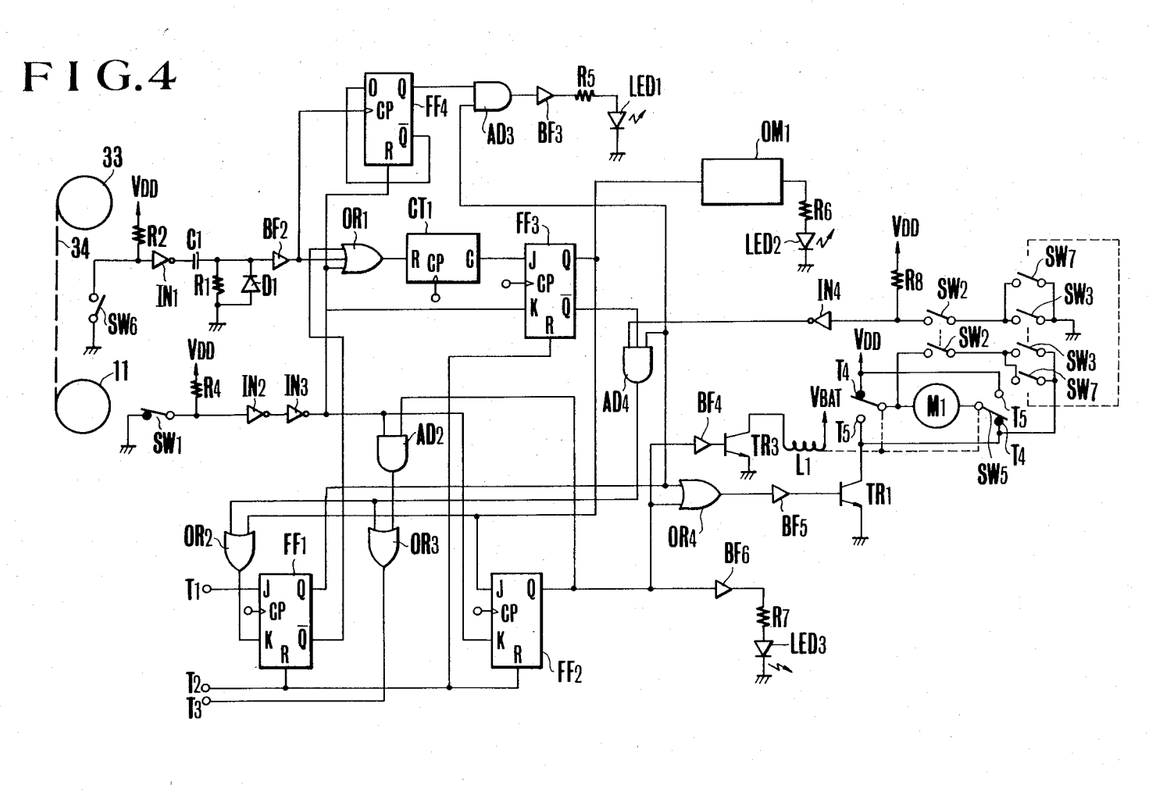
FIG. 4 is an electrical circuit diagram illustrating a control circuit of FIG. 3 embodiment.

Next, a 2nd embodiment of the invention will be described by reference to FIGS. 3 and 4. This embodiment is that as the means for detecting transportation of film 34 use is made instead of the photo-coupler 35 of 1st embodiment of another sprocket 80 in combination with a switch SW6 arranged to turn on and off as the sprocket 80 rotates. As the automatic rewinding device according to the 2nd embodiment is almost similar to that according to the aforesaid 1st embodiment in mechanism and therefore, the manner of operation, explanation will be given about the different points in mechanism, circuit and operation. 80 is that film transportation detecting sprocket fixedly mounted to a shaft 80c and arranged with its teeth to penetrate the perforations 41 of film 34. Shaft 80c is further provided with a counter drive gear 80a and a cam 80b in fixedly secured relation so that as sprocket 80 rotates, counter drive gear 80a is driven to rotate and cam 80b also to simultaneously rotate to turn on and off switch SW6. That is, sprocket 80, shaft 80a, cam 80b and switch SW6 perform an equivalent function to that of photo-coupler 35 of the 1st embodiment. Further instead of switch SW4 of back cover 39 of the aforesaid 1st embodiment, a switch SW7 for detecting cartridge 33 is provided so that when cartridge 33 is loaded in the camera, the cartridge 33 pushes the heads of movable contacts of switch SW7 to turn off SW7, permitting film to be extracted for blind exposures. When the camera is unloaded, switch SW7 is allowed to be closed, permitting a single frame operation to proceed. Next the circuit differs in the following points from that of the 1st embodiment. The photo-coupler 35, transistor TR2, buffer circuit BF1 and AND circuit AD1 are removed from the circuit of FIG. 2 or 1st embodiment, and instead the aforesaid switch SW6 is added to form a circuit of FIG. 4.

Since, in this embodiment, sprocket 80 never moves when the camera is unloaded, it is when the back cover 39 is closed with the lack of the film that a different result from the aforesaid 1st embodiment is effected, or a single frame operation is always allowed to occur with an advantage of saving electrical energy as compared with a continuous sequence of blind exposures. Another advantage is that even when film is being rewounded, switch SW6 repeats ON and OFF operation, thereby it being made possible to present the display of "film rewinding in progress" by the light-emitting diode LED1 as it is lighted on and off intermittently.

As has been described in greater detail above, the present invention is to detect the feeding condition of the film through the perforations and to make the counter circuit for initiating a rewinding operation to be reset by the signal produced by the movement of the perforations, thus providing a device of very simple structure while still permitting the rewinding operation of the camera to be initiated with high reliability when the film is exhaused from the cartridge. Also, according to the present invention, such device can be operated normally even when no film is loaded in the camera, thereby giving an additional advantage that when a test shooting is made with no film in the camera, or when the film in the camera is to be fed for blind exposures, there is no possibility of occurrence of an accidental initiation of a rewinding. According to the present invention, therefore, the operator is freed from an anxiety that the new cartridge swallows up the film leader and cannot be used when the camera is accidentally switched to the rewinding mode soon after having been loaded.

Furthermore, according to the present invention, it is made possible not only to automatically initiate a rewinding operation but also to automatically terminate the rewinding of the film when all the exposed film except the film tongue has been rewounded. Therefore the camera can be formed to an extremely simplified manageability, and the battery will not be wastefully used up.

What we claim:

1. An automatic rewinding device for film in a camera comprising:
   (a) transporting means for moving film in response to the driving force of an electric motor;
   (b) timer means having a released state and a reset state for producing a first signal a predetermined time after having been released from the reset state;
   (c) changeover means for receiving said first signal to change over a film winding operation of said transporting means to a film rewinding operation;
   (d) detecting means for detecting film movement during film winding by said transporting means and for producing a second signal for resetting said timer means in response to movement of the film;
   (e) reset means for producing a third signal for resetting said timer means when one cycle of film winding operation for one frame is completed; and
   (f) latch means for latching the first signal of said timer means, said latch means producing a fourth signal for actuating said timer means to be reset as the first signal is latched.

2. An automatic rewinding device for film in a camera comprising:
   (a) transporting means for moving film in response to the driving force of an electric motor;
   (b) timer means having a released state and a reset state for producing a first signal a predetermined time after having been released from the reset state;
   (c) changeover means for receiving said first signal to change over a film winding operation of said transporting means to a film rewinding operation;
   (d) detecting means for detecting film movement during film winding by said transporting means and for producing a second signal for resetting said timer means in response to movement of the film;
   (e) reset means for producing a third signal for resetting said timer means when one cycle of film winding operation for one frame is completed; and
   (f) switching means switchable between first and second states, said switching means being held in the first state when the film lies in a position where the film is not wound by said transporting means, and producing a fifth signal for actuating said timer means to be reset.

3. A device according to claim 2, further including:
   (g) latch means responsive to the first signal of said timer means to be set so that a current supply to said motor is initiated and to be reset when said switching means is changed from the second state to the first state.

4. A device according to claim 3, wherein the film is taken up on a spool a predetermined length and said switching means maintains the second state during the time the film is being taken up on the spool to a predetermined length.

5. An automatic rewinding device for a camera, comprising:
   (a) transporting means for transporting film by the driving force of an electric motor;
   (b) changeover means for changing over a winding operation of said transporting means to a rewinding operation;
   (c) timer means having a reset state and a released state for actuating said changeover means a predetermined time after it is released from the reset state;
   (d) detection means for detecting the winding movement of the film and bringing said timer means into the reset state by movement of the film;
   (e) reset means for bringing the timer means into a reset state when each frame of said film is wound up; and
   (f) switch means changeable between a first state and a second state, said switch being held in the first state when said film is at a position where the film winding by the transporting means is impossible so as to nullify the operation of said timer.

6. An automatic rewinding device according to claim 5, which further comprises:
   latch means for holding said transporting means in the rewinding operation state, said latch means being reset when said switch means is changed over from the second state to the first state.

7. A device as in claim 6, wherein the film is taken up on a spool a predetermined length and said switching means maintains the second state during the time the film is being taken up on the spool to a predetermined length.

8. An automatic rewinding device for a camera, comprising:
   (a) transporting means for transporting film by the driving force of an electric motor;
   (b) changeover means for changing over a winding operation of said transporting means to a rewinding operation;
   (c) timer means having a reset state and a released state for actuating said changeover means a predetermined time after it is released from the reset state;
   (d) reset means for bringing the timer means into a reset state when each frame of said film is wound up; and
   (e) switch means changeable between a first state and a second state, said switch being held in the first state when said film is at a position where the film winding by the transporting means is impossible so as to nullify the operation of said timer.

9. An automatic rewinding device for a camera, comprising:
   (a) transporting means for transporting film by the driving force of an electric motor;
   (b) changeover means for changing over a winding operation of said transporting means to a rewinding operation;
   (c) timer means having a reset state and a released state for actuating said changeover means a predetermined time after it is released from the reset state;
   (d) detection means for detecting the winding movement of the film and bringing said timer means into the reset state by movement of the film; and
   (e) switch means changeable between a first state and a second state, said switch being held in the first state when said film is at a position where the film winding by the transporting means is impossible so as to nullify the operation of said timer.

* * * * *